United States Patent
Hung

(10) Patent No.: US 7,298,741 B2
(45) Date of Patent: Nov. 20, 2007

(54) ROBUST MPEG-2 MULTIPLEXING SYSTEM AND METHOD USING AN ADJUSTABLE TIME STAMP

(75) Inventor: Szepo Robert Hung, Irvine, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 1039 days.

(21) Appl. No.: 10/375,228

(22) Filed: Feb. 27, 2003

(65) Prior Publication Data

US 2004/0170162 A1    Sep. 2, 2004

(51) Int. Cl.
*H04L 12/56* (2006.01)
*H04J 3/06* (2006.01)
*H04N 9/89* (2006.01)

(52) U.S. Cl. ............... 370/389; 370/509; 370/516; 386/16

(58) Field of Classification Search ............... None
See application file for complete search history.

(56) References Cited

U.S. PATENT DOCUMENTS

| | | | |
|---|---|---|---|
| 5,936,968 A * | 8/1999 | Lyons ................ | 370/503 |
| 6,031,960 A * | 2/2000 | Lane ................. | 386/68 |
| 6,356,567 B2 | 3/2002 | Anderson et al. ....... | 370/516 |
| 6,584,120 B1 * | 6/2003 | Shiomoto et al. ....... | 370/473 |
| 6,611,624 B1 * | 8/2003 | Zhang et al. .......... | 382/232 |
| 6,724,825 B1 * | 4/2004 | Nemiroff et al. ....... | 375/240.27 |
| 2001/0043621 A1 | 11/2001 | Anderson et al. ....... | 370/516 |
| 2005/0004940 A1 * | 1/2005 | Ikeda ................. | 707/104.1 |

* cited by examiner

*Primary Examiner*—Wing Chan
*Assistant Examiner*—Gregory B. Sefcheck
(74) *Attorney, Agent, or Firm*—Law Offices of Gerald Maliszewski; Gerald Maliszewski

(57) ABSTRACT

A system and method are provided for robust Motion Picture Experts Group (MPEG-2) multiplexing information using an adjustable time stamp. The method comprises: accepting a plurality of digital programs; encoding each program into frames; generating a decoding time stamp (DTS) and a corresponding presentation time stamp (PTS), measured with respect to a program clock reference (PCR) for each frame; generating a packetized elementary stream (PES) packet, with a PES header including the PCR, DTS, and PTS, for each frame; time division multiplexing (TDM) the PES packets into a MPEG-2 transport stream; at the time of insertion into the MPEG-2 transport stream, comparing the DTS and PTS values to the PCR value in each header; modifying the DTS value in the PES header in response to the comparison; and, transmitting the MPEG-2 transport stream.

13 Claims, 5 Drawing Sheets

ROBUST MPEG-2 MULTIPLEXING SYSTEM AND METHOD USING AN ADJUSTABLE TIME STAMP

BACKGROUND OF THE INVENTION

1. Field of the Invention

This invention generally relates to video signal processing and, more particularly, to a system and method of forming packets for transport with adjustable time stamps, that in turn permits a greater tolerance in the decoding and presentation timing.

2. Description of the Related Art

FIG. 1 is a diagram depicting the MPEG-2 packetized elementary stream (PES) packet format (prior art). As noted by Anderson et al. in U.S. Pat. No. 6,356,567, all of the fields after the PES packet length are optional. The PES packet has a PES header, an optional header, and payload. The PES header has bit start code, a packet length field, a 2-bit "10" field, a scramble control field, a priority field, a data alignment field, a copy field, a PTS/DTS (Presentation Time Stamp/Decoding Time Stamp) field, a field for other flags, and a header length field.

The "Optional Header" field includes a Presentation Time Stamp field, a Decoding Time Stamp field, an elementary stream clock reference field, an elementary stream rate field, a trick mode field, a copy info field, a Prior Packetized Elementary Stream Clock Recovery field, an extension, and stuffing.

The packet start code provides packet synchronization. The stream ID field provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the private data fields provide private information transfer.

A transport stream (TS) may contain one or more independent, individual programs, such as individual television channels or television programs, where each individual program can have its own time base, and each stream making up an individual program has its own PID. Each separate individual program has one or more elementary streams (ES) generally having a common time base. Different transport streams can be combined into a single system transport stream. Elementary stream (ES) data, that is, access units (AU), are first encapsulated into packetized elementary stream (PES) packets, which are, in turn, inserted into transport stream (TS) packets, as shown in FIG. 2.

The architecture of the transport stream (TS) packets under the MPEG-2 specifications is such that the following operations are enabled: (1) demultiplexing and retrieving elementary stream (ES) data from one program within the transport stream, (2) remultiplexing the transport stream with one or more programs into a transport stream (TS) with a single program, (3) extracting transport stream (TS) packets from different transport streams to produce another transport stream (TS) as output, (4) demultiplexing a transport stream (TS) packet into one program and converting it into a program stream (PS) containing the same program, and (5) converting a program stream (PS) into a transport stream (TS) to carry it over a lossy medium to thereafter recover a valid program stream (PS).

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaptation Control are used for payload synchronization, while the Discontinuity Indicator and Program Clock Reference (PCR) fields are used for playback synchronization. The transport scramble control field facilitates payload descrambling. Private data transfer is accomplished through the Private Data Flag and Private Data Bytes. The Data Bytes are used for private payload data transfer, and the Stuffing Bytes are used to round out a packet.

A transport stream is a collection of transport stream packets, linked by standard tables. These tables carry Program Specific Information (PSI) and are built when a transport stream is created at the multiplexer. These tables completely define the content of the stream. Two of the tables of the transport stream are the Program Association Table (PAT) and the Program Map Table (PMT).

The Program Association Table is a table of contents of the transport stream. It contains an ID that uniquely identifies the stream, a version number to allow dynamic changes of the table and the transport stream, and an association table of pairs of values. The pairs of values, PN, and PMT-PID, are the Program Number (PN) and the PID of the tables containing the program.

The Program Map Table is a complete description of all of the streams contained in a program. Each entry in the Program Map Table is related to one and only one program. The role of the Program Map Table is to provide a mapping between PID streams and programs. The program map table contains a program number that identifies the program within the transport stream, a descriptor that can be used to carry private information about the program, the PID of the packets that contain the synchronization information (PCRs), a number of pairs of values (ST, Data-PID) which, for each stream, specify the stream type (ST), and the PID of the packets containing the data of that stream or program (Data-PID). There is also a Network Information Table used to provide a mapping between the transport streams and the network, and a Conditional Access Table that is used to specify scrambling/descrambling control and access.

In use, the tables are used to select and reconstruct a particular program. At any point in time, each program component has a unique PID in the Program Map Table. The Program Map Table provides the PIDs for the selected program's audio, video, and control streams. The streams with the selected PIDs are extracted and delivered to the appropriate buffers and decoders for reconstruction and decoding.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program clock reference (PCR) and the time stamps are the Presentation Time Stamp/Decoding Time Stamp (PTS/DTS).

The decoder employs a local system clock having approximately the same 27 Megahertz frequency as the encoder. However, the decoder clock cannot be allowed to free run. This is because it is highly unlikely that frequency of the decoder clock would be exactly the same as the frequency of the encoder clock. Synchronization of the two clocks is accomplished by the Program Clock Reference (PCR) data field in the packet adaptation field of the PCR PID for the program. The Program Clock Reference values can be used to correct the decoder clock. Program Clock Reference, or PCR, is a 42 bit field. It is coded in two parts, a PCR Base having a 33-bit value in units of 90 kHz, and a PCR extension having a 9-bit extension in units of 27 MHz, where 27 MHz is the system clock frequency.

As a general rule, the first 42 bits of the first PCR received by the decoder initialize the counter in a clock generation, and subsequent PCR values are compared to clock values for fine adjustment. The difference between the PCR and the local clock can be used to drive a voltage controlled oscillator, or a similar device or function, for example, to speed up or slow down the local clock.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divided by 300. The PTS value indicates the time that the presentation unit should be presented to the user.

The system layer timing information, PCR and PTS/DTS, keep the encoder and decoder in synchronization, with the PCR values correcting the decoder clock. The timing information, PCR and PTS/DTS, arrive at the decoder about every 10-100 milliseconds for the PCR, and at least as frequently as about every 700 milliseconds for the PTS/DTS. Processing and filtering the timing signals consumes significant processor resources. This is because the clock signals are in mixed number bases, the clock signals can arrive at widely varying times, there is no way to sort out necessary interrupts from unnecessary interrupts, and, most important of all, errors in clock management are directly visible and/or audible through buffer overflow or underflow and color disturbance. However, as noted above, the relationship between PCR and the STC values are used to drive a voltage controlled oscillator or similar device. The voltage controlled oscillator or similar device speeds up or slows down the local clock driving the STC.

FIG. 2 depicts the program multiplexing process in the formation a transport stream (prior art). MPEG-2 Systems (ISO/IEC 13818-1) has become the standard for digital TV broadcast. In a digital broadcast environment each allocated frequency slot (i.e. 6 MHz) carries one MPEG-2 transport stream, and there are multiple programs (virtual channels) carried within each transport stream. In order for the transport stream to be able to carry multiple programs, the bit rate of the transport stream must be higher than the combined bit rates of these programs. Null packets are inserted into the transport stream to maintain a constant bit rate, if the combined bit rate of the programs becomes lower than the transport stream constant bit rate.

When individual programs are encoded, each video and audio frame receives a Decoding Time Stamp (DTS) and Presentation Time Stamp (PTS). The PTS is always later than or equal to the DTS. Due to the bit stream sharing (multiplexing), the packets may not always be inserted into the transport stream at the desired time instance. A certain amount of delay for each frame is inevitable.

When the bit rate of the transport stream is much higher than the combined bit rates of all the programs carried in it, it is easy for the multiplexer to properly arrange the appearance of packets from each program. In this case, there are many null packets inserted into the transport stream to take up the unoccupied time slots. However, when the transport stream gets crowded, that is, when the free space margin shrinks, the packet delay becomes more severe. Although the programs are encoded with a nominal bit rate constraint, in some instances an individual program may incur a sudden spike in the bit rate. When the bit rates spikes, the delay of packets becomes even more severe. Depending on the decoder's design, the delayed arrival of frame data in a delayed packet may cause a noticeable (to a viewer) visual defect. In the case where an I-frame has encountered a long delay, the decoder may drop that frame due to expiration. Then, the following P-frames can't be successfully decoded until the next I-frame arrives, even if they are delivered on time.

It would be advantageous if a MPEG-2 transport stream could be made more tolerant of timing delays.

It would be advantageous if the DTS and PTS time stamps could be adjusted in response to the time that associated frames are multiplexed into the transport stream.

SUMMARY OF THE INVENTION

The present invention alleviates the penalty associated with the late packet arrival in a crowded multiple-program MPEG-2 transport stream. It helps the decoder/receiver to handle the packets that would have conventionally been considered late on arrival because the Decoding Time Stamp (DTS) has expired.

Accordingly, a method is provided for robust Motion Picture Experts Group (MPEG-2) multiplexing information using an adjustable time stamp. The method comprises: accepting a plurality of digital programs; encoding each program into frames; generating a decoding time stamp (DTS) and a corresponding presentation time stamp (PTS), measured with respect to a program clock reference (PCR) for each frame; generating a packetized elementary stream (PES) packet, with a PES header including the PCR, DTS, and PTS, for each frame; time division multiplexing (TDM) the PES packets into a MPEG-2 transport stream; at the time of insertion into the MPEG-2 transport stream, comparing the DTS and PTS values to the PCR value in each header; modifying the DTS value in the PES header in response to the comparison; and, transmitting the MPEG-2 transport stream.

In some aspects of the method, comparing the DTS value to the PCR in each header includes comparing to find that:

PTS>PCR>DTS.

Then, modifying the DTS value in the PES header in response includes setting the DTS value equal to the PCR value. In other aspects, comparing the DTS value to the PCR in each header includes comparing to find that:

PCR>PTS>DTS.

Then, modifying the DTS value in the PES header in response includes modifying both the DTS and PTS values as follows: generating a value $\Delta t = PCR - DTS$; setting the DTS value equal to the PCR value; and, setting $PTS = PTS + \Delta t$.

If, comparing the DTS value to the PCR in each header finds that:

$DTS \geq PCR$.

Then, the method further comprises: leaving the DTS value in the PES header unchanged.

Additional details of the above-described method and system for transmitting MPEG-2 information using an adjustable time stamp are provided below.

DETAILED DESCRIPTION OF THE PREFERRED EMBODIMENTS

Figure 1:
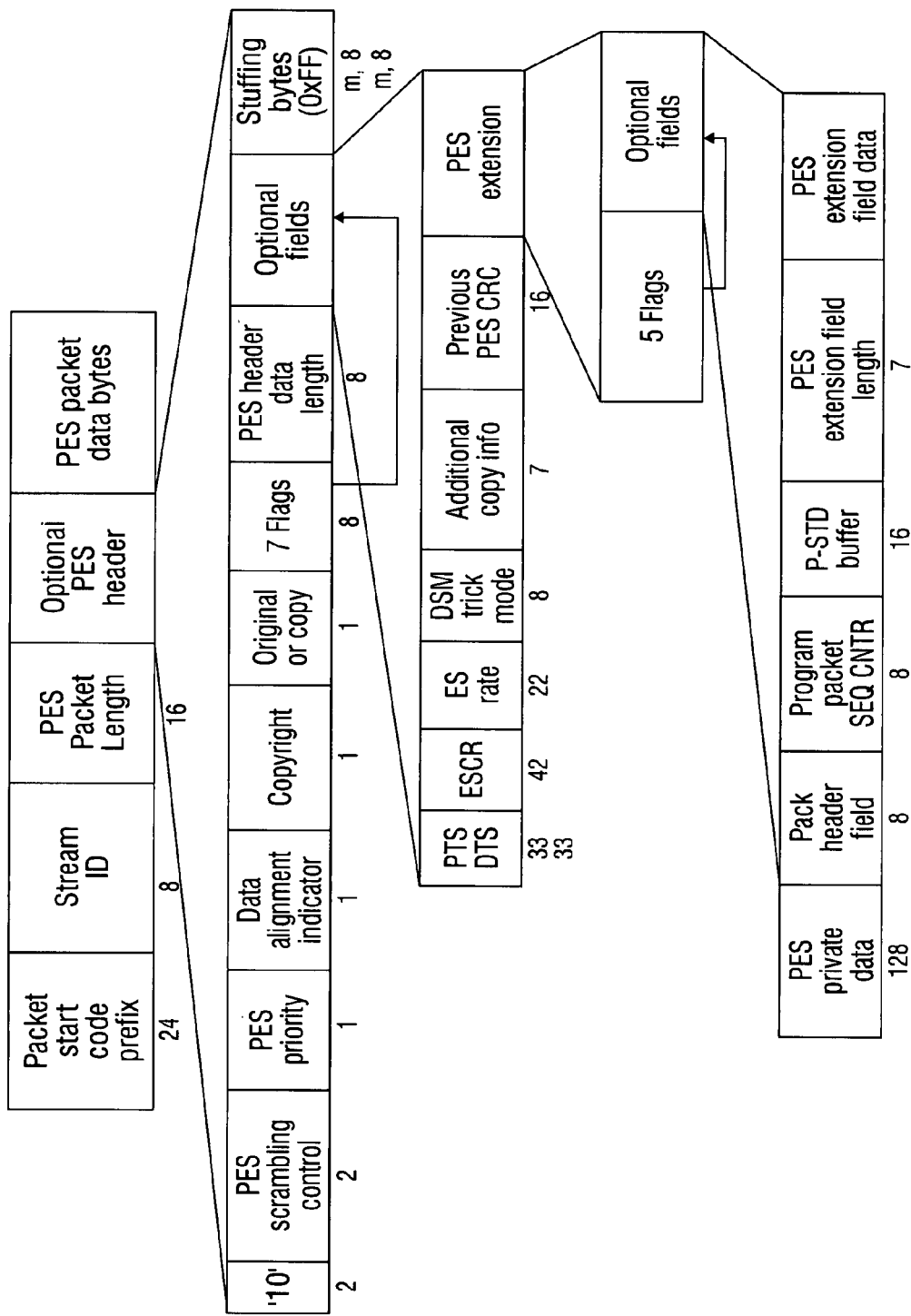
FIG. 1 is a diagram depicting the MPEG-2 packetized elementary stream (PES) packet format (prior art).
Figure 2:
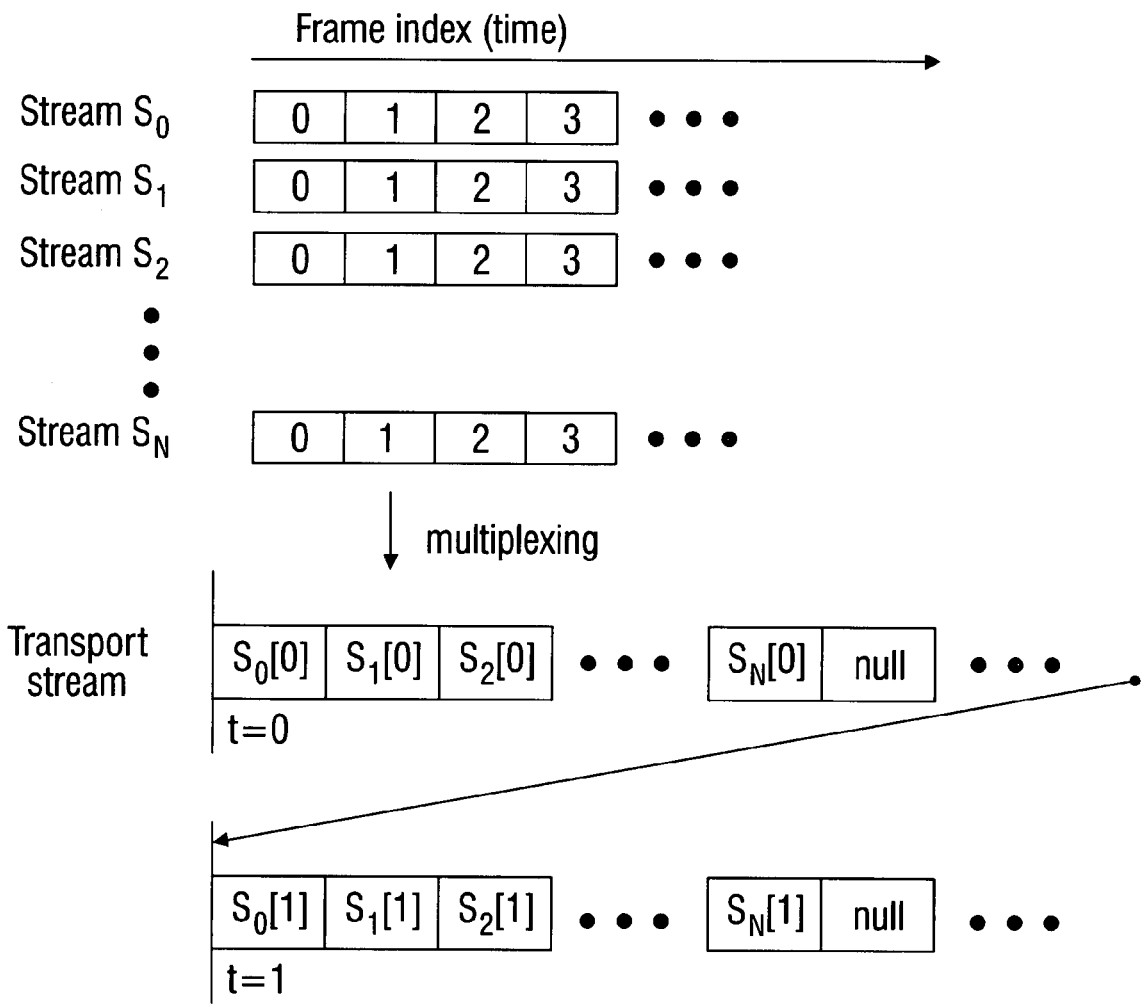
FIG. 2 depicts the program multiplexing process in the formation a transport stream (prior art).
Figure 3:
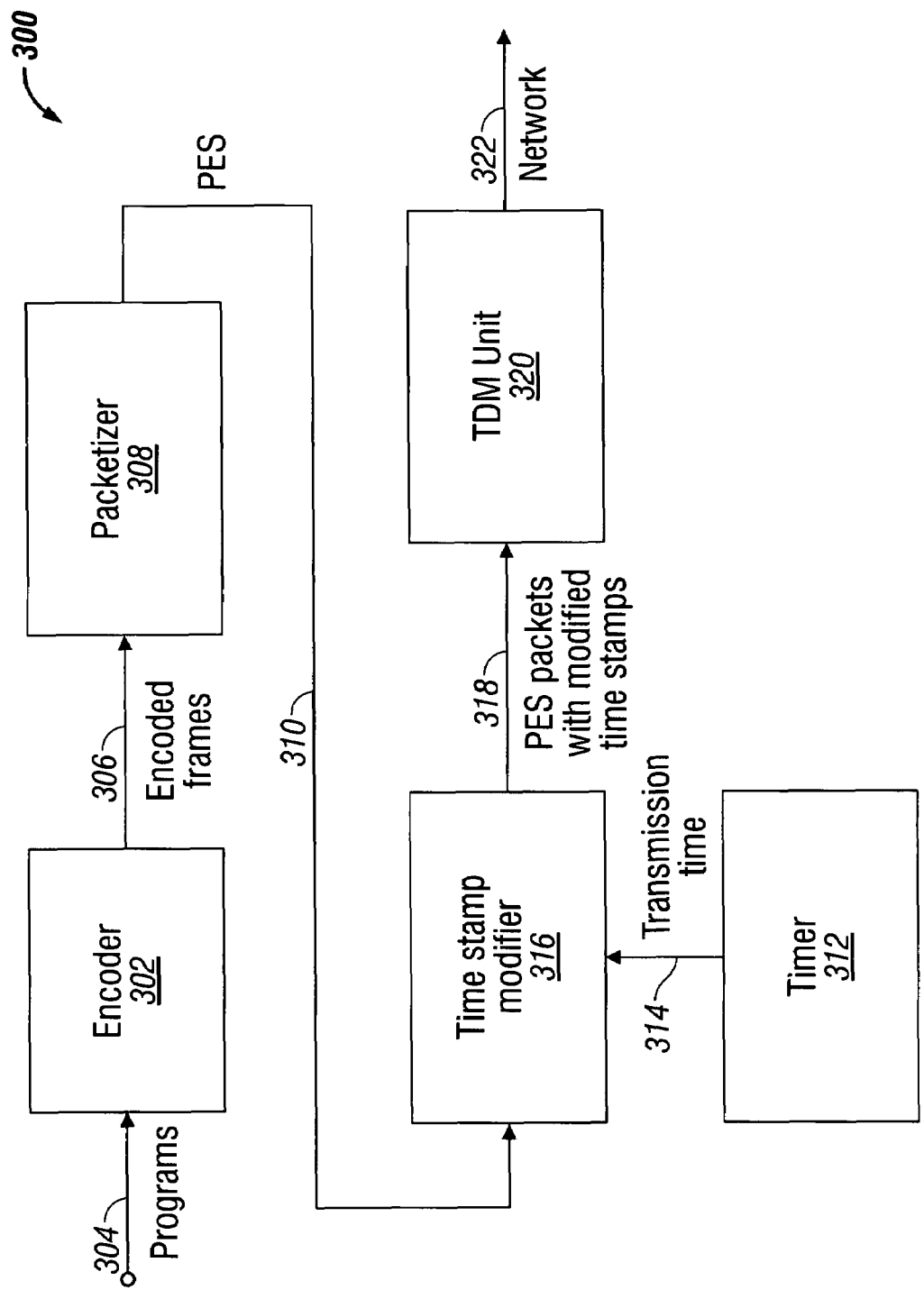
FIG. 3 is a schematic block diagram of the present invention system for transmitting Motion Picture Experts Group (MPEG-2) information using an adjustable time stamp.

FIG. 3 is a schematic block diagram of the present invention system for transmitting Motion Picture Experts Group (MPEG-2) information using an adjustable time stamp. The system 300 comprises an encoder 302 having an input on line 304 to accept a plurality of digital programs and an output on line 306 to supply each program encoded into frames. As is well understood in the art, the encoding process may entail prediction and quantization procedures, however, the details of such procedures are not necessary to an understanding of the present invention.

Typically, the encoder 302 accepts video and audio data programs and encodes the video and audio data in separate frames. In some aspects, the encoder 302 accepts programs with a variable amount of data and supplies variable length frames. As noted above, these variable length frames are at least one cause of transport stream multiplexing delays.

A packetizer 308 has an input on line 306 to accept the frames. The packetizer 308 generates a decoding time stamp (DTS) and a corresponding presentation time stamp (PTS), measured with respect to a program clock reference (PCR) for each frame. The packetizer 308 supplies a packetized elementary stream (PES) packet, with a PES header including the PCR, DTS, and PTS at an output on line 310, for each frame. Generally, the packetizer 308 generates a PTS with a value later than, or equal to the corresponding DTS.

A timer 312 has an output on line 314 to supply PES packet transmission times. A time stamp modifier 316 has an input on line 314 to accept the PES packet transmission times and an input on line 310 to accept the PES packets. The time stamp modifier 316 compares the DTS and PTS values to the PCR value in each header at transmission time and supplies PES packets with modified DTS values at an output on line 318.

A time division multiplexing (TDM) unit 320 has an input on line 318 to accept the DTS modified PES packets and an output connected to a network 322 to transmit the PES packets in a MPEG-2 transport stream. The network 322 can be an Ethernet, Intranet, or Internet to name but a few possible examples.

The time stamp modifier 316 compares the DTS value to the PCR in each header. One result that normally causes a problem for a network-connected receiver is when:

PTS>PCR>DTS.

In this situation, the frame timing has become delayed, so that the DTS, but not the PTS, trails the PCR. Conventionally, a receiver (see FIG. 4) cannot decode a frame in time for presentation if the value of DTS has already occurred. In this situation, the time stamp modifier 316 sets the DTS value equal to the PCR value.

Conventionally, an even bigger problem occurs in a receiver when the time stamp modifier 316 compares the DTS value to the PCR in each header to find that:

PCR>PTS>DTS.

In this situation, both the DTS and PTS will have already occurred (trail the PCR) at the time of arrival in the receiver. Therefore, the present invention time stamp modifier 316 modifies both the DTS and PTS values. Specifically, the time stamp modifier:

generates a value Δt=PCR−DTS;

sets the DTS value equal to the PCR value; and, sets PTS=PTS+Δt.

Alternately stated, the time stamp modifier 316 sets the DTS equal to the PCR, and delays the PTS until after the PCR.

In the normal, non-delayed circumstance, the time stamp modifier 316 compares the DTS value to the PCR in each header to find that:

DTS≧PCR.

Then, the time stamp modifier 316 leaves the DTS value in the PES header unchanged.

Figure 4:
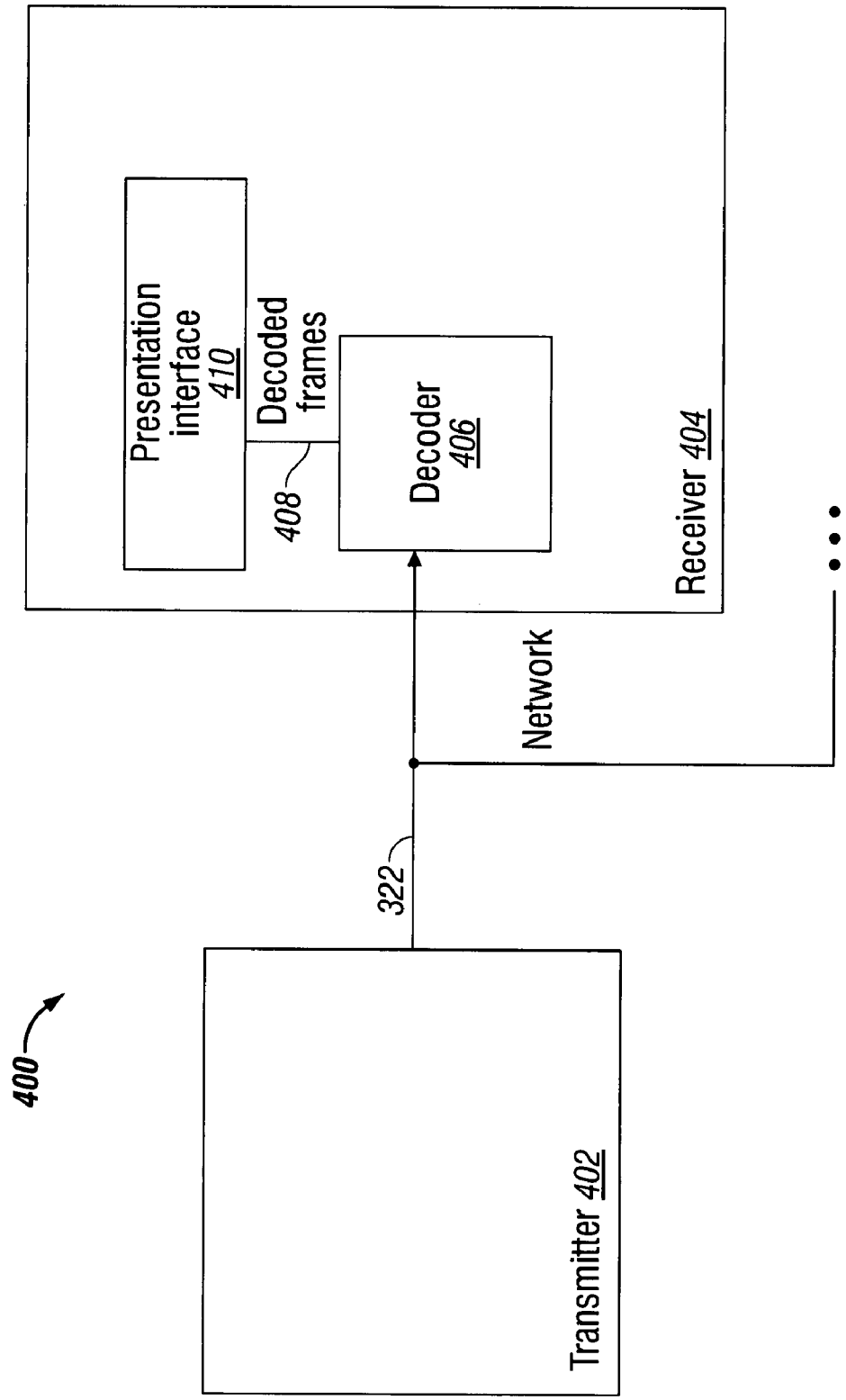
FIG. 4 is a schematic block diagram illustrating the present invention system for communicating Motion Picture Experts Group (MPEG-2) information using an adjustable time stamp.

FIG. 4 is a schematic block diagram illustrating the present invention system for communicating Motion Picture Experts Group (MPEG-2) information using an adjustable time stamp. The system 400 comprises a transmitter 402. The transmitter 402 includes an encoder, packetizer, timer, time stamp modifier, and TDM unit, as described above, to transmit PES packets in a MPEG-2 transport stream on network 322.

The system 400 also comprises a receiver 404. The receiver 404 includes a decoder 406 having a network-connected input on line 322 to accept the MPEG-2 transport stream. The decoder 406 supplies decoded frames at an output on line 408 decoded in response to the DTS. As is understood by those working in the art, the decoding process is essentially the reverse of the encoding process. It should also be understood that, prior to decoding, the transport is deconstructed into individual programs.

The receiver 404 also includes a presentation interface 410 having an input on line 408 to accept the decoded frames. The presentation interface 410 presents the decoded frames in response to the PTS. For example, the presentation interface may a television, or a recording medium such as a VCR.

The description of FIGS. 3 and 4 implies that the various system elements are enabled in hardware. However, it should be understood that these elements may also be enable in software, using a program stored in memory and a processor, or a combination of software and hardware elements.

Functional Description

The present invention is designed to alleviate the above-mentioned packet delay problem by adjusting the DTS and PTS (if necessary) of the programs at the time of multiplexing. This is particularly effective for video because there is dependency between frames. Since audio typically has no correlation between frames, the adjustment of an audio time stamp is not as effective as for video.

Each program has a Program Clock Reference (PCR). The PCR defines the time for the program. Both the DTS and PTS refer to PCR. PCR is determined by the system clock reference (SCR) at the sending side. On the decoding (receiving) side, the decoding and displaying of a frame refers to the PCR. If there is a delay in the packet transmission, the PCR may fall behind the DTS, or even the PTS. When the receiver receives such delayed packets, it may drop the frame due to expiration, if the delay exceeds the delay threshold (set by the receiver). The present invention alleviates this packet delay problem.

At the time the packet, with the PES header, is inserted into the transport stream, the DTS is compared with the PCR. If DTS≧PCR, nothing is done. However, if PTS>PCR>DTS, then DTS is set to PCR. If the delay is quite long such that PCR≧PTS≧DTS, then, let Δt=PCR−DTS, and set DTS=PCR and PTS=PTS+Δt.

With this dynamic time stamp adjustment, no frame appears to be too late to the receiver, and it's up to the receiver to decode and play back frames that have narrower spacing between them than normal. If the decoder has enough computation capability, all these frames can be decoded and played back without noticeable jitter.

Figure 5:
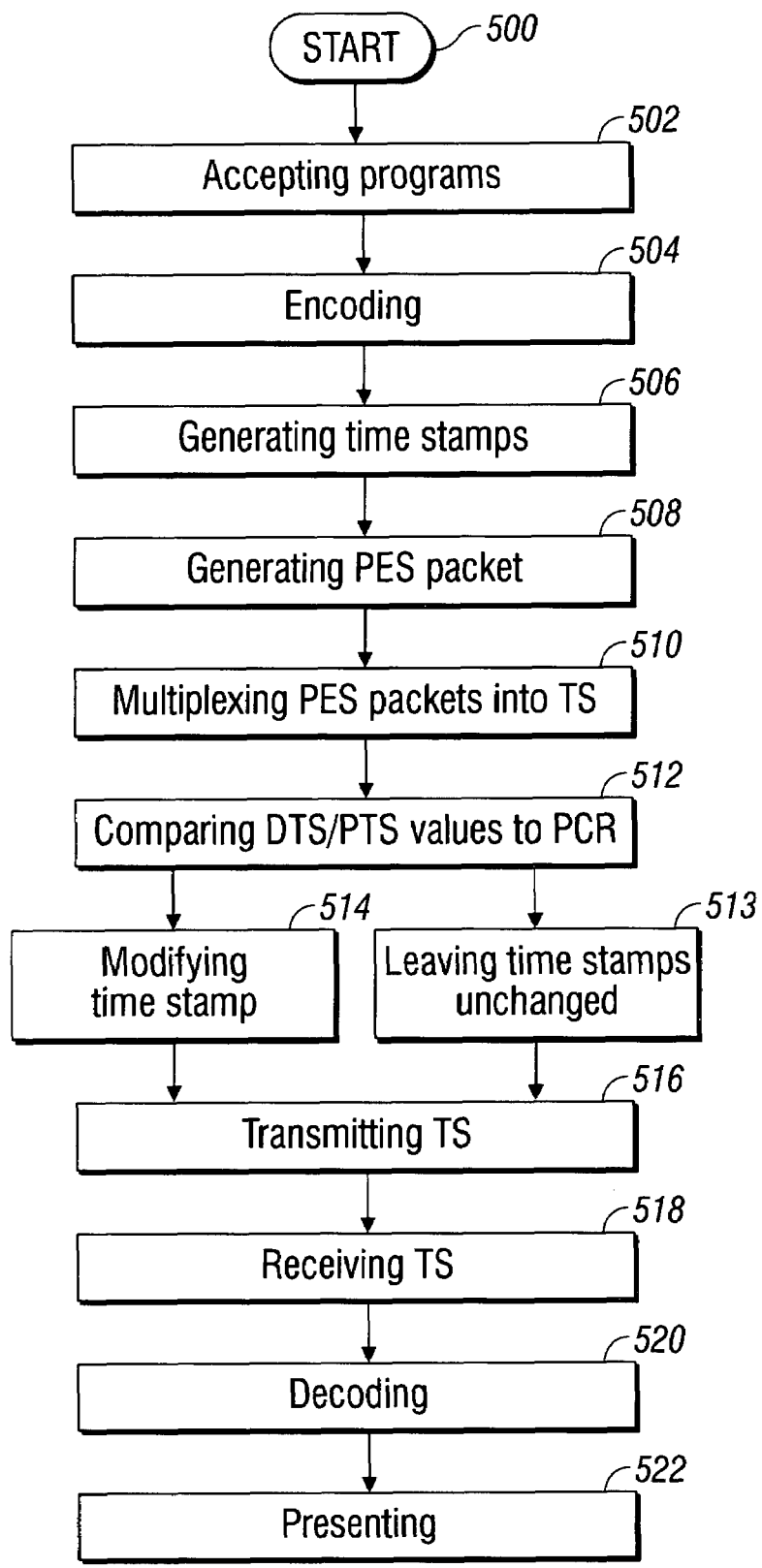
FIG. 5 is a flowchart illustrating the present invention method for robust MPEG-2 multiplexing information using an adjustable time stamp.

FIG. 5 is a flowchart illustrating the present invention method for robust MPEG-2 multiplexing information using an adjustable time stamp. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 accepts a plurality of digital programs. Step 504 encodes each program into frames. Step 506 generates a decoding time stamp (DTS) and a corresponding presentation time stamp (PTS), measured with respect to a program clock reference (PCR) for each frame. Step 508 generates a packetized elementary stream (PES) packet, with a PES header including the PCR, DTS, and PTS, for each frame. Step 510 time division multiplexes (TDM) the PES packets into a MPEG-2 transport stream (TS). Step 512, at the time of insertion into the MPEG-2 transport stream, compares the DTS and PTS values to the PCR value in each header. Step 514 modifies the DTS value in the PES header in response to the comparison. Step 516 transmits the MPEG-2 transport stream. Step 518 receives the MPEP-2 transport stream. Step 520 decodes each frame in response to its DTS. Step 522 presents each frame in response to its PTS.

In some aspects of the method, comparing the DTS value to the PCR in each header in Step 512 includes comparing to find that:

PTS>PCR>DTS.

Then, modifying the DTS value in the PES header in response to the comparison in Step 514 includes setting the DTS value equal to the PCR value.

In other aspects, comparing the DTS value to the PCR in each header in Step 512 includes comparing to find that:

PCR>PTS>DTS.

Then, modifying the DTS value in the PES header in response to the comparison in Step 514 includes substeps (not shown). Step 514a generates a value Δt=PCR−DTS. Step 514b sets the DTS value equal to the PCR value. Step 514c sets PTS=PTS+Δt.

In other aspects, comparing the DTS value to the PCR in each header in Step 512 includes comparing to find that:

DTS≧PCR.

Then, the method comprises an alternate step. Step 513 leaves the DTS value in the PES header unchanged.

In some aspects, generating a DTS and a corresponding PTS, measured with respect to a PCR for each frame in Step 506 includes generating a PTS with a value later than, or equal to the corresponding DTS.

In some aspects, accepting a plurality of digital programs in Step 502 includes accepting programs such as video and audio data. Then, encoding each program into frames (Step 504) includes encoding the video and audio data in separate frames. In other aspects, accepting a plurality of digital programs (Step 502) includes accepting programs with a variable amount of data.

A system and method have been presented to modify the PES packet time stamps, to alleviate the problem of late delivery and jitter in the presentation of video programs. A few examples have been given to illustrate the invention, but the invention is not limited to merely these examples. Other variations and embodiments of the invention will occur to those skilled in the art.

I claim:

1. A method for robust Motion Picture Experts Group (MPEG-2) multiplexing information using an adjustable time stamp, the method comprising:

accepting a plurality of digital programs;

encoding each program into frames;

generating a decoding time stamp (DTS) and a corresponding presentation time stamp (PTS), measured with respect to a program clock reference (PCR) for each frame;

generating a packetized elementary stream (PES) packet, with a PES header including the PCR, DTS, and PTS, for each frame;

time division multiplexing (TDM) the PES packets into a MPEG-2 transport stream;

at the time of multiplexing the MPEG-2 transport stream, comparing the DTS and PTS values to the PCR value in each header to find that:

PCR>PTS>DTS; and, modifying the DTS and PTS values in the PES header in response to the comparison as follows:

generating a value Δt=PCR−DTS;

setting the DTS value equal to the PCR value; and, setting PTS=PTS+Δt.

2. The method of claim 1 further including:

transmitting the MPEG-2 transport stream.

3. The method of claim 2 further comprising:

receiving the MPEP-2 transport stream;

decoding each frame in response to its DTS; and, presenting each frame in response to its PTS.

4. The method of claim 1 wherein comparing the DTS value to the PCR in each header includes comparing to find that:

DTS>PCR; and, the method further comprising:

leaving the DTS value in the PES header unchanged.

5. The method of claim 1 wherein generating a DTS and a corresponding PTS, measured with respect to a PCR for each frame includes generating a PTS with a value later than, or equal to the corresponding DTS.

6. The method of claim 1 wherein accepting a plurality of digital programs includes accepting programs selected from the group including video and audio data; and, encoding each program into frames includes encoding the video and audio data in separate frames.

7. The method of claim 1 wherein accepting a plurality of digital programs includes accepting programs with a variable amount of data.

8. A system for transmitting Motion Picture Experts Group (MPEG-2) information using an adjustable time stamp, the system comprising:

an encoder having an input to accept a plurality of digital programs and an output to supply each program encoded into frames;

a packetizer having an input to accept the frames, the packetizer generating a decoding time stamp (DTS) and a corresponding presentation time stamp (PTS), measured with respect to a program clock reference (PCR) for each frame, and supplying a packetized elementary stream (PES) packet, with a PES header including the PCR, DTS, and PTS at an output, for each frame;

a timer having an output to supply PES packet transmission times;

a time stamp modifier having an input to accept the PES packet transmission times and an input to accept the PES packets, the time stamp modifier comparing the DTS and PTS values to the PCR value in each header at transmission time and supplying PES packets with modified DTS values at an output; and, a time division multiplexing (TDM) unit having an input to accept the DTS modified PES packets and an output to transmit the PES packets in a MPEG-2 transport stream;

wherein the time stamp modifier compares the DTS value to the PCR in each header to find that:

PCR>PTS>DTS; and, wherein the time stamp modifier modifies both the DTS and PTS values as follows:

generating a value Δt=PCR−DTS;

setting the DTS value equal to the PCR value; and, setting PTS=PTS+Δt.

9. The system of claim 8 wherein the time stamp modifier compares the DTS value to the PCR in each header to find that:

DTS≧PCR; and, wherein the time stamp modifier leaves the DTS value in the PES header unchanged.

10. The system of claim 8 wherein the packetizer generates a PTS with a value later than, or equal to the corresponding DTS.

11. The system of claim 8 wherein the encoder accepts programs selected from the group including video and audio data and encodes the video and audio data in separate frames.

12. The system of claim 8 wherein the encoder accepts programs with a variable amount of data and supplies variable length frames.

13. A system for communicating Motion Picture Experts Group (MPEG-2) information using an adjustable time stamp, the system comprising:

a transmitter including:

an encoder having an input to accept a plurality of digital programs and an output to supply each program encoded into frames;

a packetizer having an input to accept the frames, the packetizer generating a decoding time stamp (DTS) and a corresponding presentation time stamp (PTS), measured with respect to a program clock reference (PCR) for each frame, and supplying a packetized elementary stream (PES) packet, with a PES header including the PCR, DTS, and PTS, for each frame, at an output;

a timer having an output to supply PES packet transmission times;

a time stamp modifier having an input to accept the PBS packet transmission times and an input to accept the PBS packets, the time stamp modifier comparing the DTS and PTS values to the PCR value in each header at transmission time and supplying PBS packets with modified DTS values at an output;

a time division multiplexing (TDM) unit having an input to accept the DTS modified PES packets and a network-connected output to transmit the PES packets in a MPEG-2 transport stream;

wherein the time stamp modifier compares the DTS value to the PCR in each header to find that:

PCR>PTS>DTS; and, wherein the time stamp modifier modifies both the DTS and PTS values as follows:

generating a value Δt=PCR−DTS;

setting the DTS value equal to the PCR value; and, setting PTS=PTS+Δt; and, a receiver including:

a decoder having a network-connected input to accept the MPEG-2 transport stream, the decoder supplying decoded frames at an output decoded in response to the DTS; and, a presentation interface having an input to accept the decoded frames, the presentation interface presenting the decoded frames in response to the PTS.

* * * * *

UNITED STATES PATENT AND TRADEMARK OFFICE
CERTIFICATE OF CORRECTION

PATENT NO. : 7,298,741 B2
APPLICATION NO. : 10/375228
DATED : November 20, 2007
INVENTOR(S) : Zhepo Robert Hung It is certified that error appears in the above-identified patent and that said Letters Patent is hereby corrected as shown below:

In col. 10, beginning at line 19, of claim 13, the term "PES" has been incorrectly printed as "PBS" in three places on lines 19, 20, and 22. Claim 13 should read as follows:

13. A system for communicating Motion Picture Experts Group (MPEG-2) information using an adjustable time stamp, the system comprising:
    a transmitter including:
        an encoder having an input to accept a plurality of digital programs and an output to supply each program encoded into frames;
        a packetizer having an input to accept the frames, the packetizer generating a decoding time stamp (DTS) and a corresponding presentation time stamp (PTS), measured with respect to a program clock reference (PCR) for each frame, and supplying a packetized elementary stream (PES) packet, with a PES header including the PCR, DTS, and PTS, for each frame, at an output;
        a timer having an output to supply PES packet transmission times;
        a time stamp modifier having an input to accept the PES packet transmission times and an input to accept the PES packets, the time stamp modifier comparing the DTS and PTS values to the PCR value in each header at transmission time and supplying PES packets with modified DTS values at an output;
        a time division multiplexing (TDM) unit having an input to accept the DTS modified PES packets and a network-connected output to transmit the PES packets in a MPEG-2 transport stream;
    wherein the time stamp modifier compares the DTS value to the PCR in each header to find that: PCR • PTS • DTS; and,

UNITED STATES PATENT AND TRADEMARK OFFICE
CERTIFICATE OF CORRECTION

PATENT NO. : 7,298,741 B2
APPLICATION NO. : 10/375228
DATED : November 20, 2007
INVENTOR(S) : Zhepo Robert Hung It is certified that error appears in the above-identified patent and that said Letters Patent is hereby corrected as shown below:

wherein the time stamp modifier modifies both the DTS and PTS values as follows:
 generating a value •t = PCR – DTS;
 setting the DTS value equal to the PCR value; and,
 setting PTS = PTS + •t; and,
a receiver including:
 a decoder having a network-connected input to accept the MPEG-2 transport stream, the decoder supplying decoded frames at an output decoded in response to the DTS; and,
 a presentation interface having an input to accept the decoded frames, the presentation interface presenting the decoded frames in response to the PTS.

Signed and Sealed this

Eighth Day of April, 2008

JON W. DUDAS
*Director of the United States Patent and Trademark Office*